United States Patent [19]

Kobayashi et al.

[11] Patent Number: 4,946,382

[45] Date of Patent: Aug. 7, 1990

[54] METHOD FOR COMBUSTING FUEL CONTAINING BOUND NITROGEN

[75] Inventors: Hisashi Kobayashi, Putnam Valley, N.Y.; Louis S. Silver, Montreal, Canada

[73] Assignee: Union Carbide Corporation, Danbury, Conn.

[21] Appl. No.: 355,451

[22] Filed: May 23, 1989

[51] Int. Cl.⁵ .............................................. F23C 1/10
[52] U.S. Cl. ........................................ 431/8; 431/187; 239/8; 239/418; 110/261; 110/347
[58] Field of Search ............... 431/8, 10, 187, 181, 431/354; 239/8, 419.5, 424.5, 422, 418; 110/347, 348, 341, 260, 261

[56] References Cited

U.S. PATENT DOCUMENTS

| | | | |
|---|---|---|---|
| 2,941,587 | 6/1960 | Hagy et al. | 158/99 |
| 4,050,879 | 7/1977 | Takahashi et al. | 431/174 |
| 4,357,134 | 11/1982 | Katsushige et al. | 431/9 |
| 4,378,205 | 3/1983 | Anderson | 431/5 |
| 4,541,796 | 9/1985 | Anderson | 431/187 |
| 4,765,258 | 8/1988 | Zauderer | 110/347 |
| 4,790,743 | 12/1988 | Leikert et al. | 110/261 |

FOREIGN PATENT DOCUMENTS 2070761  9/1981  United Kingdom ............... 110/261

*Primary Examiner*—Edward K. Look
*Assistant Examiner*—Frank H. Stephan
*Attorney, Agent, or Firm*—Stanley Ktorides

[57] ABSTRACT

A method for combusting fuel containing bound nitrogen to achieve reduced $NO_x$ emissions wherein the oxidant and fuel are injected separately into a combustion zone through a burner and the oxidant is injected with a momentum equal to at least three times the fuel stream momentum and at an angle equal to or greater than the sum of the angles of the fuel stream periphery and oxidant stream periphery with their respective centerlines.

19 Claims, 2 Drawing Sheets

METHOD FOR COMBUSTING FUEL CONTAINING BOUND NITROGEN

TECHNICAL FIELD

This invention relates to post-mixed combustion wherein fuel and oxidant are injected separately into a combustion zone and thereafter mix and combust within the combustion zone.

BACKGROUND ART

A recent significant advancement in the field of post mixed combustion is the aspirator burner and method described and claimed in U.S. Pat. No. 4,378,205 Anderson and U.S. Pat. No. 4,541,796-Anderson. This technology enables one to carry out combustion with oxygen or oxygen-enriched air without the very high temperatures and poor mixing characteristics of oxygen combustion, thus combustion without the generation of high levels of nitrogen oxides ($NO_x$) and without causing local hot spots within the combustion zone. This is accomplished using a defined large distance between the fuel and oxidant injection points and aspiration of furnace gases into the oxidant prior to mixture and combustion with the fuel.

Many fuels contain bound nitrogen. In the combustion of such fuels, nitrogen, which can lead to $NO_x$ formation, may come from sources exogenous to the fuel but mostly comes from the fuel itself. Accordingly methods designed to combust fuel for low $NO_x$ formation wherein nitrogen is present apart from the fuel, are generally not effective for the combustion of fuel containing bound nitrogen in order to achieve reduced $NO_x$ emissions.

In addition, known low $NO_x$ combustion Methods which relay on angled oxidant and fuel streams experience unstable combustion or blow-off if the divergence exceeds even a small angle.

It is therefore an object of this invention to provide a method for combusting fuel containing bound nitrogen to achieve reduced $NO_x$ emissions.

SUMMARY OF THE INVENTION

The above and other objects which will become apparent to one skilled in the art upon a reading of this disclosure are attained by the present invention which is:

A method for combusting fuel containing bound nitrogen to achieve reduced $NO_x$ emissions comprising:
  (A) injecting into a combustion zone fuel containing bound nitrogen in an axially flowing stream;
  (B) injecting oxidant into the combustion zone in at least one stream spaced from the fuel injection point, said oxidant comprising pure oxygen or oxygen-enriched air, said oxidant being injected at an angle equal to or greater than the sum of the angles formed by the periphery of the fuel stream with the fuel stream axial centerline and the spreading angle of the oxidant stream, said oxidant being injected such that the total oxidant momentum is at least three times the momentum of the fuel stream; and
  (C) entraining fuel from the fuel stream into the oxidant stream(s) and combusting entrained fuel with oxidant.

DETAILED DESCRIPTION

The method of this invention will be described in detail with reference to the Drawings.

Figure 1:
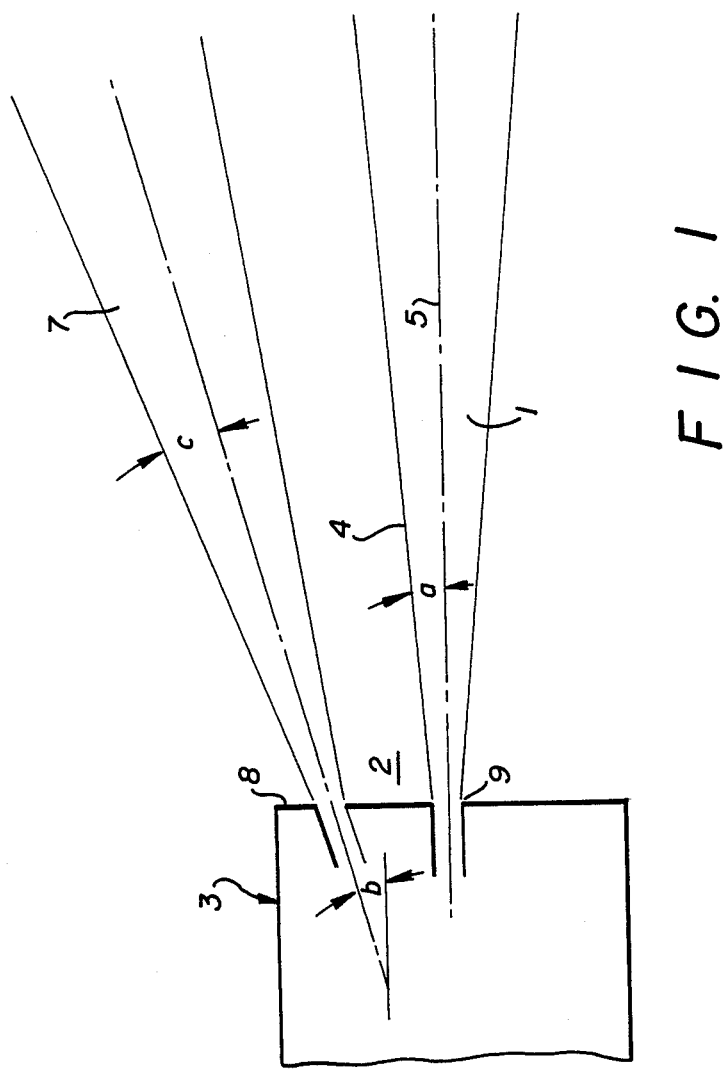
FIG. 1 is a simplified cross-sectional representation of one arrangement by which the method of this invention can be carried out.

Referring now to FIG. 1, fuel 1 containing bound nitrogen is injected into combustion zone 2 from burner 3 in an axially flowing direction. By the term "bound nitrogen" it is meant any chemical compound except for molecular nitrogen which contains at least one chemically bound nitrogen atom. Some simple examples of such compounds are ammonia, hydrogen cyanide and pyridine. Fuels containing bound nitrogen typically include oils and coals. In these fuels nitrogen is chemically bound in complex molecular forms and often incorporated in amines or heterocyclic rings. The fuel is injected into the combustion zone having a certain momentum which is the product of its mass and velocity. Generally the fuel is injected into the combustion zone at a velocity within the range of from 10 to 200 feet per second.

As the fuel stream comes out of the injector tube 9 the stream expands in a roughly conical manner so that the periphery 4 of the fuel stream forms an angle, a, with the axial centerline 5 of the fuel stream. This angle is generally within the range of from 5 to 10 degrees for a gaseous fuel stream from a straight round injector. Conical fuel flow deflectors are sometimes used to increase the angle of the spreading fuel stream. For oil burners the angle of the atomized fuel droplets stream will vary depending on the design of the oil atomizer nozzle; typically this angle is within the range of from 5 to 30 degrees. Atomizing gas is often used in the oil atomizer to produce fine oil droplets. Air and steam are the most commonly used atomizing gases, while oxygen and fuel gases are sometimes used. When air, oxygen-enriched air or oxygen is used as the atomizing gas, the flowrate of oxygen contained in the atomizing gas must be less than 20 percent, and preferably less than 10 percent, of the flowrate of oxygen required for complete combustion of the fuel. A preferred oil atomizer is disclosed and claimed in U.S. Patent No. 4,738,614-Snyder, et al.

Oxidant 7 is injected into combustion zone 2 from burner 3 spaced from the fuel injection point so that the fuel and oxidant are injected separately into the combustion zone and do not form a combustible mixture until after they are both within the combustion zone. The oxidant may be oxygen-enriched air or technically pure oxygen having an oxygen concentration exceeding 99.5 percent. Preferably the oxidant has an oxygen concentration exceeding 30 percent.

The oxidant is injected at a velocity generally within the range of from 200 to 1000 feet per second. As the oxidant is injected into the combustion zone, the periphery of the oxidant stream forms an angle with the oxidant stream centerline. This spreading angle is generally within the range of from 5 to 10 degrees.

The oxidant is injected into the combustion zone in at least one stream and preferably in from 3 to 16 streams. One particularly preferred arrangement has the fuel being injected into the combustion zone in a centrally located stream with the oxidant being injected into the combustion zone through a plurality of streams in a circle or ring around the centrally located fuel stream. Preferably the number of circularly oriented oxidant streams is within the range of from 3 to 16.

The oxidant is injected into the combustion zone away from the fuel stream at an angle, b, which is equal to or greater than the sum of the angles formed by the periphery of the fuel stream with the fuel stream axial centerline, i.e. angle a, and the spreading angle of the oxidant stream, shown in FIG. 1 as angle c. Generally the injection angle b of the oxidant will be within the range of from 15 to 45 degrees.

The oxidant is injected into the combustion zone with a total momentum, i.e. the sum of the momentums of each of the individual oxidant streams, which is at least equal to three times the momentum of the fuel. Preferably the total oxidant momentum exceeds the fuel momentum by a factor within the range of from 10 to 30. Preferably at least 50 percent of the individual oxidant streams have a momentum which at least eguals the fuel stream momentum and most preferably each individual oxidant stream has a momentum which at least eguals the fuel stream momentum.

The higher momentum of the oxidant streams establishes a bulk furnace gas circulation pattern whereby furnace gases and fuel are entrained into the oxidant streams due to the jet aspiration effects of the oxidant streams. Since the oxidant streams are injected away from the fuel stream and the momentum of the fuel stream is weaker than that of the oxidant streams, mixing of fuel with oxidant is delayed and controlled by the aspiration effects of the oxidant jets. Fuel is first mixed with hot furnace gases containing low levels of oxygen and combustion takes place with insufficient oxygen to complete the combustion. Combustion is completed as the fuel and the incomplete combustion products of the fuel rich combustion are entrained into the oxidant streams and additional oxygen is provided for complete combustion reactions.

The high momentum and the high level of oxygen of the oxidant enable an injection angle which is significantly higher than conventional injection angles. This, along with the subsequent fuel entrainment into the oxidant, enables combustion with very low $NO_x$ generation while avoiding a blow-off problem.

The injection of the fuel and oxidant separately into the combustion zone but preferably from the same burner, i.e. at approximately the same axial starting point such as burner face 8, enables furnace gases, such as combustion products, to aspirate into the fuel and thereafter the fuel to be entrained into the oxidant stream(s) to form a combustible mixture which is then combusted.

Oxygen may also be introduced into the combustion zone in one or more straight streams or streams having an angle less than that defined above. In such a case at least 50 percent of the oxidant streams must be at the above-defined large divergent angles.

In order to further illustrate the invention and to demonstrate the improved results obtainable thereby, the following examples and comparative examples were carried out. They are presented for illustrative and demonstrative purposes and are not intended to be limiting.

A burner was fired at a firing rate of 568,000 BTU/HR. The fuel was No. ≠fuel oil which contained about 0.54 weight percent bound nitrogen. The fuel was injected into the combustion zone from the burner at a rate of 31.7 pounds per hour with 150 standard cubic feet per hour (SCFH) of air as atomizing gas at a velocity of about 79 feet per second and thus had a momontum of 0.94 lb-ft/sec$^2$ The periphery of the fuel stream formed an angle of approximately 10 degrees with the fuel stream centerline. Oxidant containing 99.5 percent oxygen was injected into the combustion zone from the burner separately from the fuel injection. The oxidant was injected into the combustion zone in eight streams arranged in a circular pattern around the centrally located fuel stream at a total flowrate of 1130 SCFH. The oxidant was injected at a velocity of about 614 feet per second and thus the total oxidant momentum was 16.2 lb-ft/sec$^2$ and each oxidant stream had a momentum of about 2 lb-ft/sec$^2$. Each oxidant stream was injected into the combustion zone at an angle of 30 degrees away from the fuel stream. Taking into account the atomizing air, the oxygen concentration of the total oxidant provided to the combustion zone was about 90 percent Combustion was carried out and the $NO_x$ emissions in the combustion zone flue were measured. The procedure was repeated and the results of both examples are shown in FIG. 2 as data points 1 and 2.

For comparative purposes the procedure described above was repeated seven times with oxidant having an oxygen concentration which was within the range of from about 35 to 100 percent, except that the oxidant was injected into the combustion zone in a direction substantially parallel to that of the fuel stream centerline. That is, the oxidant was not injected into the combustion zone at an angle. Combustion was carried out and the $NO_x$ emissions in the combustion zone flue were measured and are shown in FIG. 2 as line A.

Figure 2:
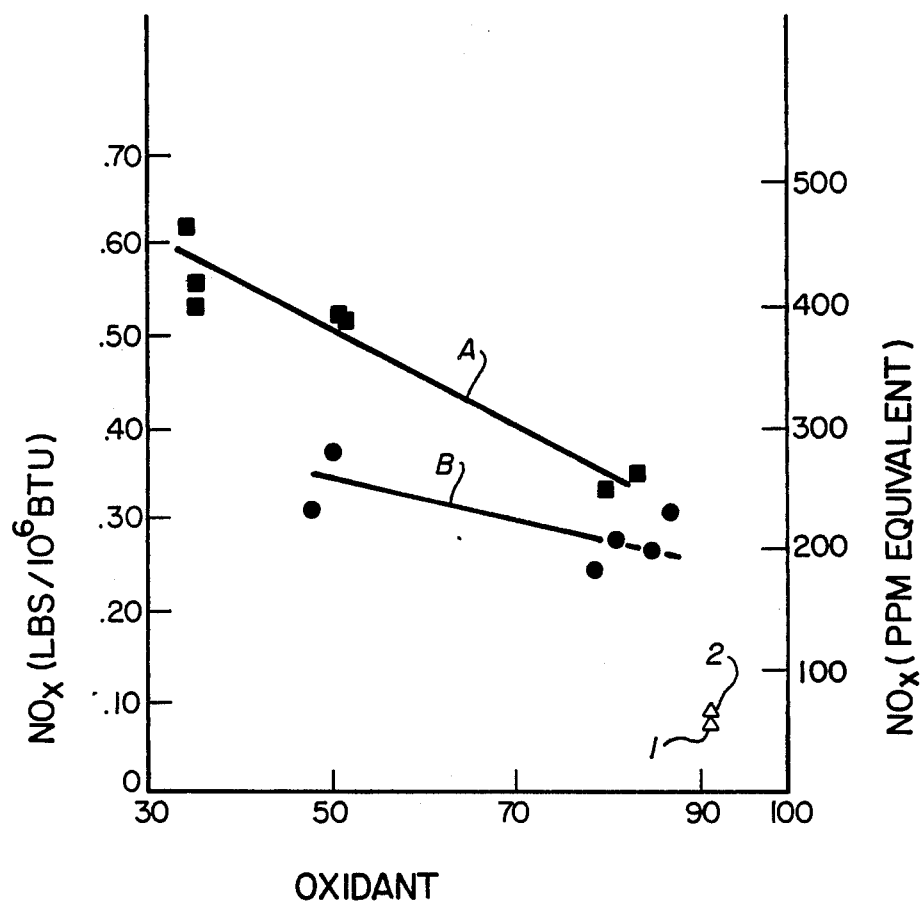
FIG. 2 is a graphical representation of $NO_x$ emissions from combustion carried out with the method of this invention and with combustion carried out with a known combustion method.

As can be clearly seen from the results presented in FIG. 2, the method of this invention enables one to carry out combustion of fuel containing bound nitrogen while generating a significantly reduced level of $NO_x$ emissions over that possible when the method of this invention is not employed.

The procedure was repeated six times except that the oxidant was injected through four nozzles angled 30 degrees away from the fuel stream and through four straight nozzles. The $NO_x$ emissions were measured and are shown in FIG. 2 as line B. As can be seen, there was some improvement in $NO_x$ emissions over that attained when the present invention was not practiced (line A); however it can be seen that significantly improved $NO_x$ reduction was attained when the invention was practiced in its preferred form (data points 1 and 2).

Although the method of this invention has been described in detail with reference to certain specific embodiments, those skilled in the art, will recognize that there are other embodiments within the spirit and scope of the claims.

We claim:

1. A method for combusting fuel containing bound nitrogen to achieve reduced $NO_x$ emissions comprising:
   (A) injecting into a combustion zone fuel containing bound nitrogen in an axially flowing stream;
   (B) injecting oxidant into the combustion zone in at least one stream spaced from the fuel injection point, said oxidant comprising pure oxygen or oxygen enriched air, said oxidant being injected at an angle equal to or greater than the sum of the angles formed by the periphery of the fuel stream with the fuel stream axial centerline and the spreading angle of the oxidant stream, said oxidant being injected such that the total oxidant momentum is at least three times the momentum of the fuel stream; and (C) entraining fuel from the fuel stream into the oxidant stream(s) and combusting entrained fuel with oxidant.

2. The method of claim 1 wherein the fuel is oil.

3. The method of claim 1 wherein the fuel is injected into the combustion zone at a velocity within the range of from 10 to 200 feet per second.

4. The method of claim 1 the fuel stream periphery forms an angle with the fuel stream centerline within the range of from 5 to 15 degrees.

5. The method of claim 1 wherein the oxidant has an oxygen concentration exceeding 30 percent.

6. The method of claim 1 wherein the oxidant is injected into the combustion zone at a velocity within the range of from 200 to 1000 feet per second.

7. The method of claim 1 wherein the oxidant is injected into the combustion zone at an angle within the range of from 15 to 45 degrees.

8. The method of claim 1 wherein the total oxidant momentum exceeds the fuel momentum by a factor within the range of from 3 to 30.

9. The method of claim 1 wherein the oxidant is injected into the combustion zone in from 3 to 16 streams.

10. The method of claim 1 wherein the fuel is injected into the combustion zone in a centrally located stream and the oxidant is injected into the combustion zone in a plurality of streams arranged in a ring around the centrally located fuel stream.

11. The method of claim 10 wherein the number of the oxidant streams is within the range of from 3 to 16.

12. The method of claim 1 wherein at least some of the bound nitrogen of the fuel is contained in a chemical compound comprising a heterocyclic ring.

13. The method of claim 1 wherein at least some of the bound nitrogen of the fuel is contained in a chemical compound comprising an amine group.

14. The method of claim 1 wherein the fuel stream is atomized into fine droplets.

15. The method of claim 14 wherein the atomization is carried out using atomizing gas.

16. The method of claim 15 wherein the atomizing gas comprises oxygen and the oxygen provided to the combustion zone with the atomizing gas does not exceed 20 percent of the oxygen required for complete combustion of the fuel.

17. The method of claim 1 additionally comprising oxidant injection into the combustion zone in one or more streams having an angle less than that defined by clause (B), wherein the number of oxidant streams which are defined by clause (B) is at least 50 percent of the total oxidant streams.

18. The method of claim 1 wherein at least 50 percent of the individual oxidant streams have a momentum which at least eguals the fuel stream momentum.

19. The method of claim 1 wherein each individual oxidant stream has a momentum which at least eguals the fuel stream momentum.

* * * * *

UNITED STATES PATENT AND TRADEMARK OFFICE
CERTIFICATE OF CORRECTION

PATENT NO. : 4,946,382
DATED : August 7, 1990
INVENTOR(S) : H. Kobayashi et al

It is certified that error appears in the above-identified patent and that said Letters Patent is hereby corrected as shown below:

In column 1, line 20, after "thus" insert --achieving--.

In column 1, line 36, delete "Methods" and insert therefor --methods--.

In column 3, in each of lines 22 and 24, delete "eguals" and insert therefor --equals--.

In column 3, line 68, delete "£" and insert therefor --6--.

In column 4, line 6, insert a period after "$sec^2$".

In column 4, line 54, delete the comma after "art".

In each of claim 18, line 3 and claim 19, line 2, delete "eguals" and insert therefor --equals--.

Signed and Sealed this

Twenty-seventh Day of August, 1991

Attest:

HARRY F. MANBECK, JR.

*Attesting Officer*    *Commissioner of Patents and Trademarks*